United States Patent Office 3,135,519
Patented June 2, 1964

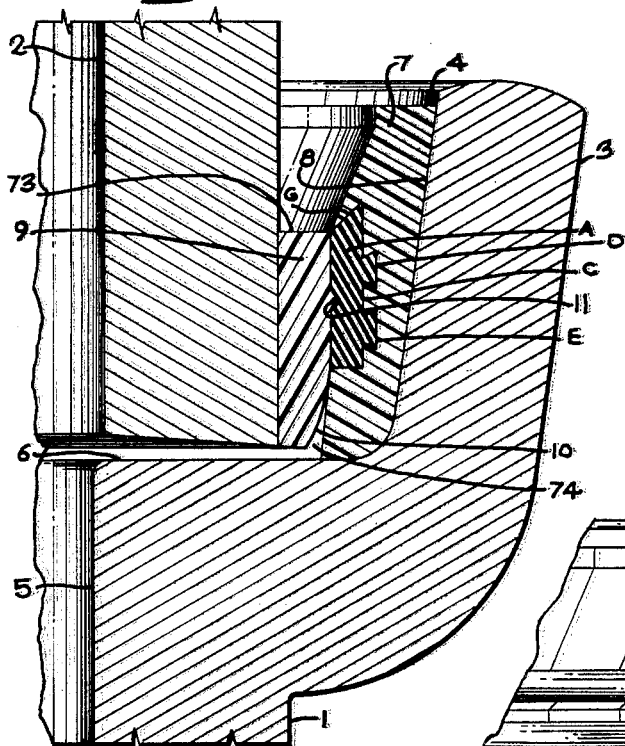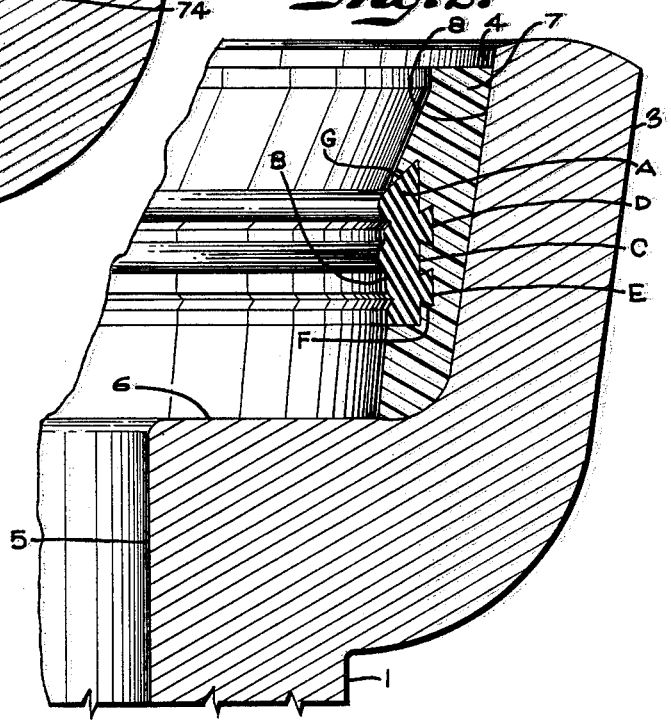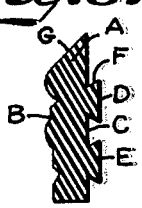

3,135,519
GASKETED JOINTS FOR CERAMIC PIPE AND METHOD AND APPARATUS FOR FORMING SAME
Elmer R. Ligon and George E. Pitzer, Pittsburg, Kans., assignors to W. S. Dickey Clay Manufacturing Company, Kansas City, Mo., a corporation of Delaware
Filed Apr. 18, 1960, Ser. No. 23,016
6 Claims. (Cl. 277—207)

This invention relates to improvements in gasketed joints for ceramic pipe.

The principal object of the present invention is the use of a foamed epoxy resinous material for a pipe joint to reduce the density of the resin and applying a resilient gasket material to the resinous material on one end of the pipe in a manner so that it will adhere thereto and so that the bell and spigot ends when joined together by pressing the spigot end into the bell of the next adjacent pipe will form a tight seal and will compensate for deflection or expansion and contraction of the ceramic pipe to which it is applied.

Heretofore, various types of compression materials have been used to fill the space between the bell and spigot end of ceramic pipe. We have found hard non-compressing resin may be used. The resin may or may not be cast in place and cured. Thermo-setting resins such as polyesters, epoxies, phenol-formaldehyde, etc. have been used. When the resin cures (polymerizes or cross-links) a shrinkage occurs and some resins tend to pull away from the pipe destroying the bond between the pipe and the resin. When shrinkage occurs in this manner or in thermal shrinkage it will result in a rupture of the bond between the hard plastic and ceramic or shrinkage due to changes in temperature over a short period of time. We have found that the thermal coefficient of expansion of most firm resins is many times that of burned clay pipe. The resin expands and contracts at a different rate and amount than the clay pipe with changes in temperature causing failing of adhesion. The coefficient of expansion due to changes in temperature can be reduced by use of a filler having lower coefficient of expansion, but this cheapens the resin mix and even with this use of fillers there will still be shrinkage resulting in pulling the resin loose when the temperature change occurs.

We have found that in using a hard resin and foaming the same the thermal expansion of the resin per unit volume is changed to a much lower figure than that of the solid resin. The foam, gas or air will serve as a filler and thus make a less dense resin which will occupy more volume per pound, and the physical properties of the foam can be adjusted to the compression value needed.

Another object of the present invention is to provide the collar of foamed resin on one end of the pipe with a resilient gasket or band for reduced thermal expansion of the resin volume and prevention of thermal shrinkage in the ceramic pipe or pipe joints and reduced thermal conductivity of the resin and reduction of thermal shock.

In accomplishing these and other objects of the invention, we have provided improved details of structure the preferred forms of which are shown in the accompanying drawings wherein:

FIG. 1 is an enlarged fragmentary sectional view through a pipe joint embodying the present invention.

FIG. 2 is an enlarged fragmentary sectional view of the bell end of a pipe with the compressible gasket bonded in the resin band positioned therein.

FIG. 3 is an enlarged transverse sectional view through the compressible gasket to show the details thereof.

The epoxy resins adapted for use in the foaming operation of our invention to make the resinous bands for the bell and spigot ends of the pipe are polymerization products of epoxidized 4, 4' isopropylidenediphenol or bis-phenol-A. Epoxy resins are based on one of several epoxy compounds, the most familiar of which are the reaction products of poly-phenolic compounds of which 4, 4' isopropylidenediphenol or bis-phenol-A is the most widely used and an epoxy compound, principally epichlorohydrin. Other epoxy resins may be used but we have found the "828-Epoxy-Resin" which is a low molecular weight epoxy resin manufactured as the diglycidyl ether of bis-phenol-A suitable for our purpose. This resin alone can be foamed but a small percentage of plasticized resin may be added. Any suitable plasticized resin will accomplish my purpose. Shell No. 81 resin is a plasticizer we have found suitable to add to the "828 Epoxy-Resin."

We have also found a plasticizer of another epoxy resin may be added to the "828 Epoxy-Resin" as a plasticizer and one type is the Epotuf 6140 which is a flexibilizing resin. When this type of resin is used, 10% is added to 90% of the "828 Epoxy-Resin" which makes a very good formulation for our purpose.

To this is added Santocel, other diatomaceous earth, silica filler or an aerated filler. We also use a hardener or curing agent, such as amino-ethyl-piperizine, or other tertiary amine products, which reacts directly cross-linking and extending the chains of the resin. The cure or hardening is accomplished by the addition of similar amine products but we preferably add diethylenetriamine to accomplish this purpose. Freon 12 or the formula dichlorodifloromethane is the foaming agent and is blended into the resin and the resin and diethylenetriamine are kept at warm temperatures and pumped proportionately through the blending head into the mold as later described. The density of the foam can be controlled by the percentage of Freon used. Substitutes may be used for the Freon such as compressed air or the like.

We sometimes modify the resins to give toughness to the product. In addition, we have used the Freon 12 under slight pressure at normal temperature conditions to maintain it liquified. This material is proportioned into the blend of resins and when properly blended into the resins it will expand forming a closed cell foam at atmospheric pressure and normal temperature conditions. As the exotherm of the resin takes place the temperature rise creates additional foaming. The mold is closed in order to confine the volume of foam in place. This provides a resin with a fixed density.

The epoxy resins may be made from epoxidized and polymerized 4, 4' isopropylidenediphenol together with certain additives and fillers, and curing by the addition of diethylenetriamine or other similar amine products. These products and the Freon 12 are blended and kept at warm temperatures and pumped proportionately through the mixing head and into the molds.

We have found the following formulations parts A, B and C typical of the hard resin mix to be adhered to the bell and spigot ends of the pipe:

Part A:
    75 parts—828 Epoxy-Resin
    25 parts—81 Epoxy-Resin
    2 parts—Santocel (diamtomaceous earth)
Part B: 4 parts—Freon 12 (foaming agent)
Part C: 20 parts—N. amino-ethyl-piperzine (curing agent)

The insert band for the bell end of the pipe and the collar or band for the spigot end of the pipe, as above described, does not compress to any appreciable extent. When it is applied to the ceramic pipe it will not flow out therefrom. It is applied to the ceramic pipe, as later described, and in its liquid state will enter the pores of the ceramic pipe and adhere thereto due to the adhesive features of the liquid and thereby forms a hard, tough skin on the outside of the insert and band.

Another important feature of our invention is to provide a band or strip of compressible material and mold the same into the hard resin insert of the bell end of the pipe. The insert could very well be molded or attached to the band on the spigot end, but we have here illustrated it on the bell end. This resilient compressible gasket or band of material is a polyurethane composition or vinyl plastisol. Various ruber materials may be used for the gasket such as neoprene, Thiocol, or a plasticized vinyl chloride. Other materials, such as a mixture of polyethylene or polypropylene glycol and toluene-di-isocyanate (NCO) may be used. We find a compressible material of approximately 65 Shore hardness suitable for the compressible gasket.

This polyurethane gasket or strip is formed separately and may be of any desired shape, but we have here illustrated the side which is embed in the hard resinous material of the bell end of the gasket to have two ribs spaced from each other circumferentially of the strip which have inwardly tapered sides wherein the molded resinous material will flow therearound to securely hold the strip of resinous material in the bell end so that when the spigot end is placed in the bell end it will become compressed as illustrated in FIG. 1. It will be seen that this strip or insert is readily compressible whereas the strip on the bell and spigot ends of hard resinous material retains its shape.

Referring to the drawings:

1 designates a tubular clay or ceramic pipe having a spigot end 2 and an enlarged or bell end 3 forming an open socket 4 which may be slightly tapered in an inward direction towards the open sleeve portion 5 of the pipe and terminating in a shoulder 6. The end 2 is substantially straight and adapted to be projected into the socket 4 of the bell portion 3. A band 7 of foamed resin of the formula herein above set forth is adhered to the inside 8 of the socket 4 of the bell portion 3 of the pipe as illustrated in FIG. 2, and as later referred to.

A collar or band 9 of a similar foamed resin as herein set forth is arranged on the outer surface of the spigot end 2 and is preferably slightly tapered as indicated at 10 towards the open end of the pipe 1. The collar or gasket 9 has an annular or circumferential bead 11 that is substantially mid-way between the upper and lower ends respectively of the collar 9. The inside wall 12 of the foamed resinous band 7 is substantially vertical while the outer wall conforms to the tapered wall 8 of the bell portion 3. The ingredients for the foamed resinous bands 7 and 9 are blended and mixed and poured in place through use of suitable molds (not shown).

In order to provide a resiliency or compressible member on one of the hard or foamed resinous bands, we provide a gasket having an elongated body A, an irregular side B, and a side C having spaced ribs D and E with walls tapering inwardly towards the body A as indicated at F. The irregular side may be ridges or grooves, as desired, for a purpose later shown. The upper end tapers downwardly towards the irregular end, as indicated at G.

This resilient, compresible gasket A is formed separately in a mold (not shown) and consists of the polyurethane or other material hereinabove specified. The band or gasket A is placed in the bell end of the pipe prior to pouring of the resinous material forming the band 7.

The foamed resinous material is applied to the bell portion of the pipe to form the band 7, and particularly around the ribs D and E of the gasket A.

After the foamed resinous material is set, the mold may be removed from the bell end of the pipe, leaving the gasket A securely and firmly bound and embedded in the foamed resinous material 7.

The foamed resinous material is applied to the spigot end of the pipe with a suitable mold to form the band 9 around the outer wall 60 of the pipe.

After the foamed resinous material is set, the mold may be removed and a true diameter and face is formed to which a next succeeding section of pipe may be joined.

The resinous material and other ingredients as above set forth when cured under slight pressure result in good wetting and penetration providing a smooth surface next to the mold and an excellent fit on the pipe. The resinous material enters the pores of the ceramic pipe and adheres thereto. It will not pull away therefrom due to shock or rupture or cracking of the pipe.

The resilient compresible gasket A will remain firmly embedded within the foamed resinous material 7 in the bell end of the pipe. The gasket A is slightly porous and the foamed epoxy resinous material, being liquid when it is poured in the mold, will readily adhere to the gasket A, and flow around the ribs D and E to firmly hold the gasket in place.

The pipe sections may be joined together by pressing the spigot end of one pipe into the bell end of the next adjacent pipe by any suitable means. In pressing the spigot end with the band of resinous material 9 therearound, including the bead 11 thereon, it will contact the tapered edge G of the gasket A and press thereagainst and pass the same by compressing it so that the outer surface of the band 9 will cause the irregular side face B of the gasket A to assume a substantially straight surface except that the tapered side of the upper ends thereof which is not compressed by the resinous band 9 will assume the position shown in FIG. 1, the upper tapered edge extending over the upper edge 73 of the band 9, also as shown in FIG. 1.

The bead 11 on the band 9 will be embedded in the compressible gasket member A, and there will be a complete and tight seal of the band or collar 9 with the compressible gasket A. It will be noted, however, that a slight space 74 will be left between the band or collar 9 and the lower end of the band 7 on the bell end of the pipe. This will provide a clearance to allow for four or five degrees of deflection of the pipe without breaking a seal between the foamed resinous material and the resilient gasket material.

It will be obvious from the foregoing that we have provided an improved compressible gasket for ceramic pipe or the like wherein the gas bubbles (Freon) become a filler and makes a more economical resin. Foams can be used with densities of 10 to 20 pounds per cubic foot as compared to densities of 100 to 120 pounds per cubic foot for mineral-filled resin. One pound of the foamed resin will fill ten times the volume of one pound of mineral-filled resin.

The blending, mixing and foaming of the ingredients above set forth will be obvious from the description and apparatus described.

It is to be understood that while we have illustrated and described one form of our invention, it is not to be limited to the specific form or arrangement of parts herein described and shown except insofar as such limitations are included in the claims.

What we claim and desire to secure by Letters Patent is:

1. A pipe joint comprising, a pair of pipe sections having interfitting bell and spigot ends, a circumferential band of foamed resinous material bonded and cured on the interior periphery of the bell end in adhered relation therewith, a collar of foamed resinous material bonded and cured on the outer periphery of said spigot end in adhered relation therewith, said collar and said band each having an outer surface, a sealing ring of compressible material having an inner and outer peripheral surface, at least one annular rib integral with one of said surfaces of said sealing ring and extending radially outwardly and circumferentially of said one surface, said annular rib having sides diverging outwardly from said sealing ring in a general axial direction from said sealing ring one surface, at least one bead extending radially outwardly from the other surface of said sealing ring, said annular rib having a portion thereof molded into the resinous material of one of said band or collar, said rib being mechanically interlocked with said resinous material by said diverging sides, said bead being so dimensioned, constructed and arranged that upon telescopingly joining said sections, said bead will be compressed by and form a seal with the other of said band or collar.

2. A pipe joint structure as set forth in claim 1 wherein said collar has an annular rib on the outer surface thereof for engaging the sealing ring and said sealing ring has a plurality of inwardly extending laterally spaced flexible heads circumferentially of the sealing ring inner surface for engaging the outer surface of the collar and cooperating with the annular rib thereon and its engagement with said sealing ring to provide a fluid pressure seal.

3. A pipe joint structure as set forth in claim 2 wherein said sealing ring has a plurality of said annular ribs integral therewith and extending outwardly in laterally spaced circumferential relation and embedded in the surrounding band in the bell end, said collar and band having outer and inner surface portions adjacent the seal ring that are engaged in response to relative deflection of the sections to provide support therefor at said joint.

4. A pipe joint structure as set forth in claim 1 wherein the foamed resinous material of the collar and band consists of a mixture of an epoxy resin, a plasticizer, a filler, a curing agent and dichlorodifloromethane to cause the foaming action.

5. A pipe joint structure as set forth in claim 2 wherein said foamed resinous material of the band and collar consists of diglycidyl ether of 4, 4' isopropylidenediphenol, a plasticizing resin, diatomaceous earth, N. amino ethyl piperzine and dichlorodifloromethane.

6. A pipe joint structure as set forth in claim 3 wherein the foamed resinous material of the collar and band consists of 75 parts of diglycidyl ether of 4, 4' isopropylidenediphenol, 25 parts of plasticizing resin, 2 parts diatomaceous earth, 20 parts N. amino ethyl piperzine and 4 parts dichlorodifloromethane.

References Cited in the file of this patent

UNITED STATES PATENTS

| | | |
|---|---|---|
| 993,321 | Coddington | May 23, 1911 |
| 2,537,659 | Eisner et al. | Jan. 9, 1951 |
| 2,661,500 | Seymour | Dec. 8, 1953 |
| 2,739,134 | Pary et al. | Mar. 20, 1956 |
| 2,741,498 | Elliott | Apr. 10, 1956 |
| 2,770,476 | Cleverly | Nov. 13, 1956 |
| 2,792,240 | Risley | May 14, 1957 |
| 2,831,820 | Aase et al. | Apr. 22, 1958 |
| 2,857,622 | Cleverly | Oct. 28, 1958 |
| 2,889,582 | Cooper | June 9, 1959 |
| 2,896,976 | Wiltse | July 28, 1959 |

OTHER REFERENCES

Book: "Epoxy Resins," by I. Skeist (pages 23, 24, 89–92 and 249 relied upon), published by Reinhold Publishing Corp., New York, on September 28, 1958.

Book: "Epoxy Resins," by H. Lee and K. Neville (page 18 relied upon), published by McGraw-Hill Book Co., Inc., New York, on July 31, 1957.